(12) United States Patent
El Aile et al.

(10) Patent No.: US 9,963,035 B2
(45) Date of Patent: May 8, 2018

(54) REMOVABLE STEERING WHEEL AND PEDALS FOR AUTONOMOUS VEHICLE

(71) Applicant: Ford Global Technologies, LLC, Dearborn, MI (US)

(72) Inventors: Steven R. El Aile, Sterling Heights, MI (US); John P. Joyce, West Bloomfield, MI (US); Andrew Brown, Canton, MI (US); Scott J. Lauffer, Northville, MI (US); Samer Abbas, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 132 days.

(21) Appl. No.: 15/016,583

(22) Filed: Feb. 5, 2016

(65) Prior Publication Data
US 2017/0225570 A1 Aug. 10, 2017

(51) Int. Cl.
| | |
|---|---|
| *B62D 1/183* | (2006.01) |
| *B60K 37/06* | (2006.01) |
| *B60R 7/06* | (2006.01) |
| *B60R 21/203* | (2006.01) |
| *B60R 21/205* | (2011.01) |
| *B60K 37/00* | (2006.01) |
| *B60K 37/04* | (2006.01) |
| *B60K 26/02* | (2006.01) |

(Continued)

(52) U.S. Cl.
CPC ............. *B60K 37/06* (2013.01); *B60K 37/00* (2013.01); *B60K 37/04* (2013.01); *B60R 7/06* (2013.01); *B60R 21/203* (2013.01); *B60R 21/205* (2013.01); *B62D 1/183* (2013.01); *B60K 26/02* (2013.01); *B60K 2026/023* (2013.01); *B60K 2350/941* (2013.01); *B60K 2350/945* (2013.01); *B60K 2350/946* (2013.01); *B60K 2350/948* (2013.01); *B60R 2021/0004* (2013.01); *B60T 7/04* (2013.01)

(58) Field of Classification Search
CPC .................................. B62D 1/183; B60R 7/06
See application file for complete search history.

(56) References Cited

U.S. PATENT DOCUMENTS

| | | | |
|---|---|---|---|
| 1,400,121 A | 12/1921 | Wills | |
| 3,583,519 A * | 6/1971 | Meyer | B60K 37/00 180/90 |

(Continued)

OTHER PUBLICATIONS

Vijayan, Jaikumar, "Google Gets Green Light to Test Self-Driving Cars on Public Roads", Enterprise IT Technology News, Opinions and Reviews, May 16, 2015.

(Continued)

*Primary Examiner* — James A English
(74) *Attorney, Agent, or Firm* — Frank A. MacKenzie; Bejin Bieneman PLC

(57) ABSTRACT

A dashboard assembly for a vehicle includes a dashboard defining a receiving niche. The niche is alignable with a driver seat location, and is selectively fillable by each of a removable steering module and a removable filler module. The removable steering module includes a steering module base. A steering wheel support is fixed to the steering module base. A steering wheel is rotatably fixed to the steering wheel support. A steering wheel connector connects the steering wheel to a vehicle steering actuator. The removable filler module includes a filler module base.

14 Claims, 9 Drawing Sheets

(51) Int. Cl.
*B60R 21/00* (2006.01)
*B60T 7/04* (2006.01)

(56) References Cited

U.S. PATENT DOCUMENTS

| | | | | |
|---|---|---|---|---|
| 5,088,571 | A * | 2/1992 | Burry | B60H 1/0055 |
| | | | | 180/90 |
| 5,103,660 | A | 4/1992 | Johnson | |
| 5,606,892 | A * | 3/1997 | Hedderly | B62D 1/16 |
| | | | | 280/775 |
| 5,813,288 | A * | 9/1998 | Simonetti | B62D 1/16 |
| | | | | 180/90 |
| 6,027,088 | A * | 2/2000 | Stedman | B62D 1/195 |
| | | | | 248/200 |
| 6,234,040 | B1 * | 5/2001 | Weber | B62D 1/195 |
| | | | | 74/411.5 |
| 6,237,439 | B1 * | 5/2001 | Weber | B62D 1/16 |
| | | | | 280/777 |
| 7,416,199 | B2 * | 8/2008 | Yamada | B62D 1/185 |
| | | | | 280/93.502 |
| 7,611,165 | B2 * | 11/2009 | Manwaring | B60K 35/00 |
| | | | | 280/775 |
| 7,753,403 | B2 * | 7/2010 | Fukawatase | B60R 21/2032 |
| | | | | 280/730.1 |
| 9,073,574 | B2 | 7/2015 | Cuddihy et al. | |
| 9,096,150 | B2 | 8/2015 | Cuddihy et al. | |
| 9,108,584 | B2 | 8/2015 | Rao et al. | |
| 2002/0134610 | A1 * | 9/2002 | Pastwa | B60Q 1/1461 |
| | | | | 180/315 |
| 2015/0142246 | A1 | 5/2015 | Cuddihy et al. | |
| 2017/0072891 | A1 * | 3/2017 | Paxton | B60R 21/205 |
| 2017/0174203 | A1 * | 6/2017 | Brown | B60R 21/205 |

OTHER PUBLICATIONS

Cher, David, "Link & Go Autonomous Full Electric Vehicle," AKKA Technologies, France; European Conference on Nanoelectronics and Embedded Systems for Electric Mobility, University of Bologna, Italy; Sep. 25-26, 2012.
Hardigree, Matt, "This Make The Steering Wheel Obsolete", The Morning Shift, Oct. 16, 2013.

* cited by examiner

REMOVABLE STEERING WHEEL AND PEDALS FOR AUTONOMOUS VEHICLE

BACKGROUND

In an autonomous vehicle capable of driving from one location to another without one or more inputs typically provided by a human operator, e.g., steering, a steering wheel is no longer needed to pilot the vehicle. However, present vehicles typically rely on a steering wheel to house a driver-side airbag. Further, the lack of a steering wheel can handicap vehicle development by making it more difficult to place a vehicle under a driver's control. Driver control is desirable during vehicle development for purposes including, by way of example, evaluating a vehicle's response to extreme dynamic maneuvers such as rapid lane changes. An inability to manually steer the vehicle can result in placing test drivers at higher risk, as it would be more difficult to moderate or abort such maneuvers made under autonomous control, or make such maneuvers with an unfamiliar electronic control such as a joystick. Further, some vehicle owners may prefer the familiarity of being in a vehicle having a steering wheel, or a steering wheel may be needed to allow a vehicle occupant to assume control, even if the steering wheel is inactive in an autonomous mode.

DETAILED DESCRIPTION

A removable steering wheel steering wheel can be moved between an installed driving position and a stowed position, disconnected from the vehicle. An exemplary steering wheel includes an airbag. Therefore, when the steering wheel is removed, a driver-side airbag is mounted in a location other than on the steering wheel is employed. In one exemplary configuration, a steering wheel module is replaced with a filler module which includes an airbag. The system architecture enables the use of a steering wheel for development purposes, and enables the easy provision of a steering wheel as a customer-requested option.

Relative orientations and directions (by way of example, upper, lower, bottom, rearward, front, rear, back, outboard, inboard, inward, outward, let, right) are set forth in this description not as limitations, but for the convenience of the reader in picturing at least one embodiment of the structures described.

Figure 1:
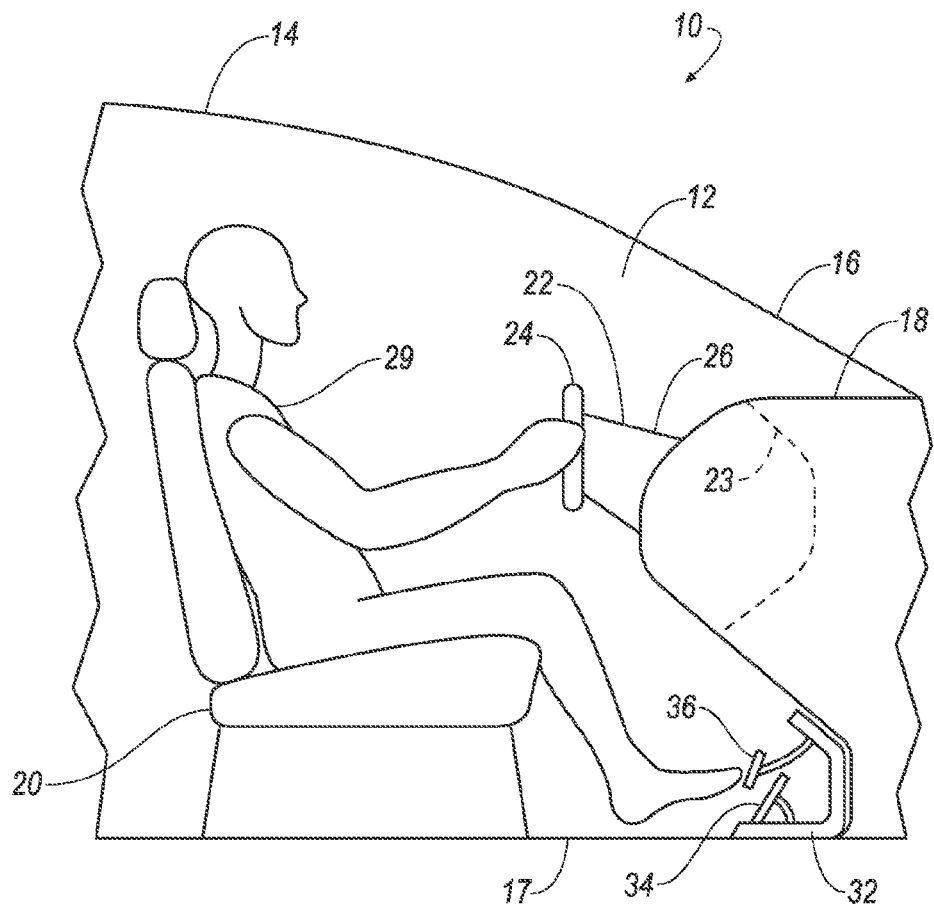
FIG. 1 is a schematic side view of an exemplary driver seat and steering wheel and floor control pedal arrangement of a vehicle with a steering wheel and floor control pedals in an installed position.
Figure 2:
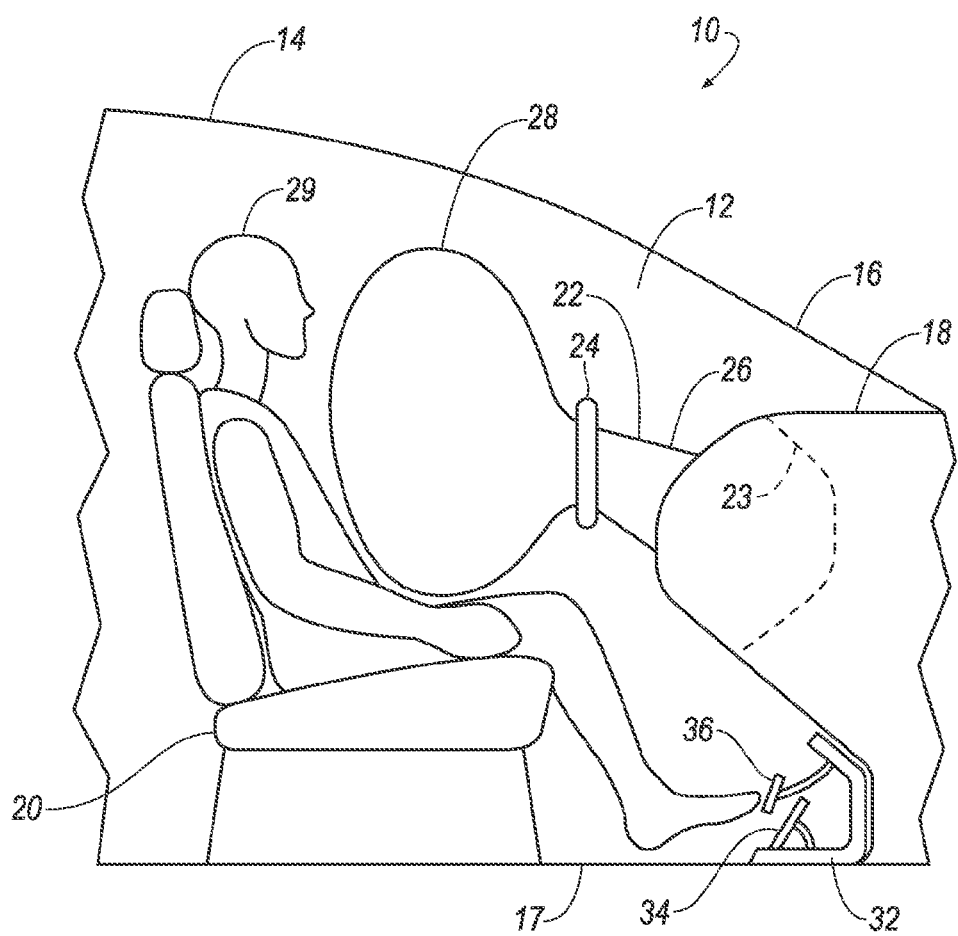
FIG. 2 is a schematic side view of the exemplary driver seat and steering wheel and floor control pedal arrangement of FIG. 1 with an air bag deployed.
Figure 5:
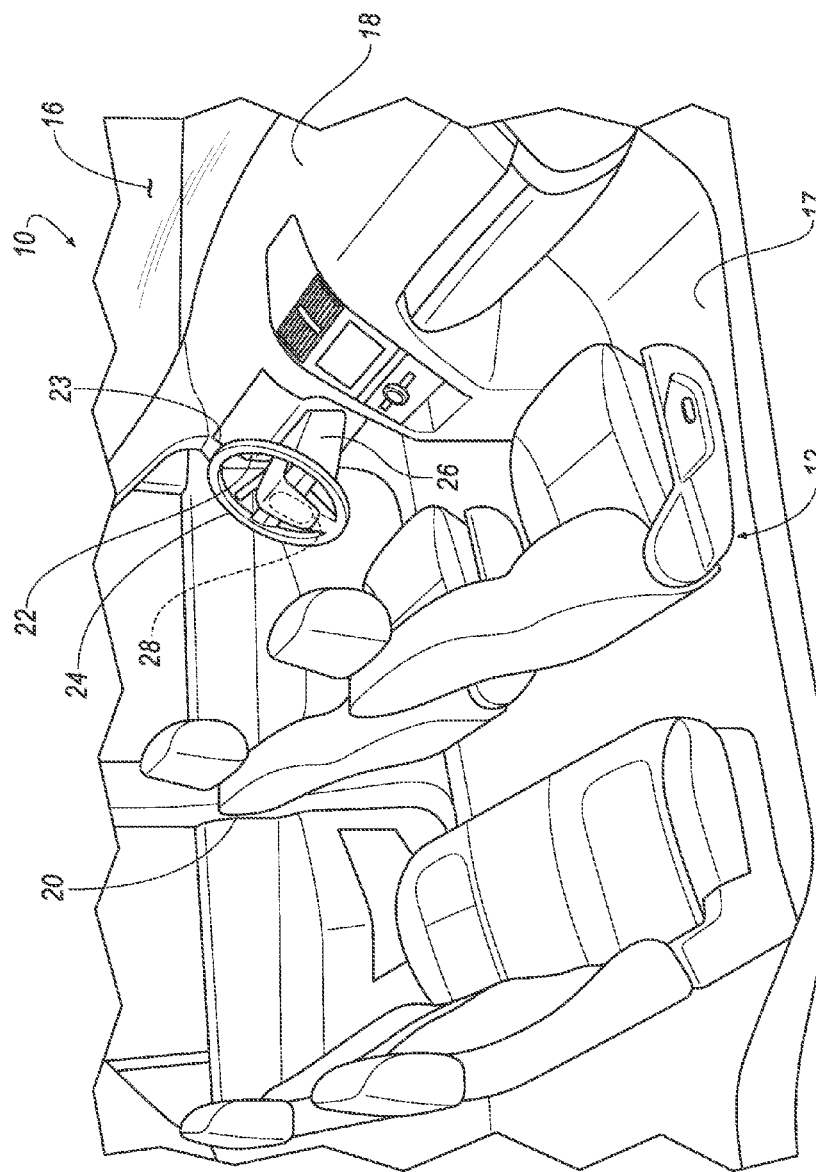
FIG. 5 is a perspective view of the exemplary interior seat and steering wheel arrangement of FIG. 1.
Figure 9:
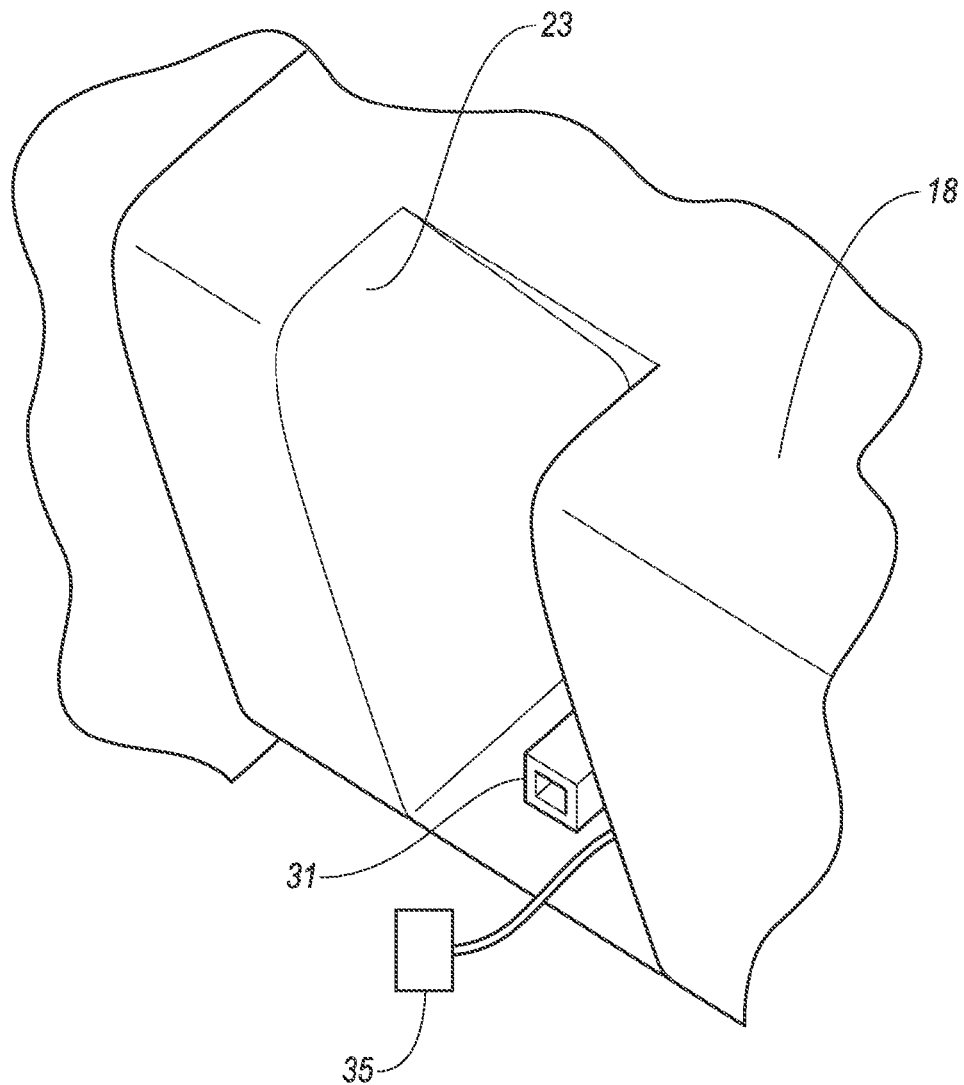
FIG. 9 is a perspective enlarge view of an exemplary dashboard niche.
Figure 10:
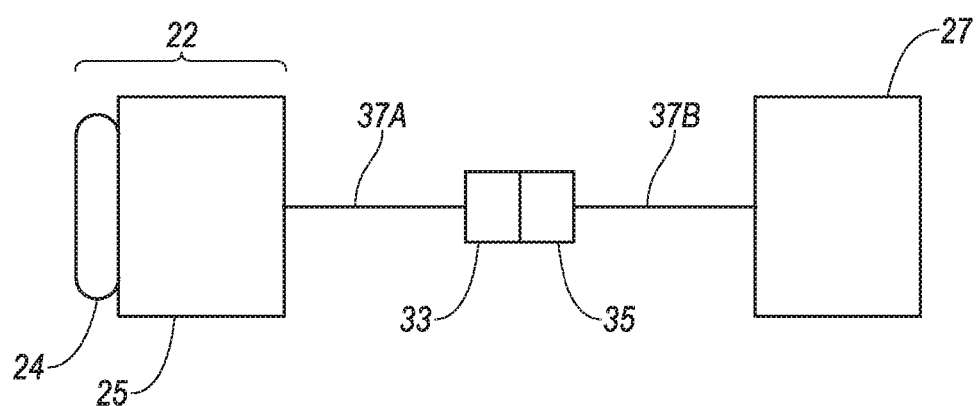
FIG. 10 is a schematic view of a steering module connected to a steering actuator.

FIG. 1, FIG. 2 and FIG. 5 show a portion of an exemplary vehicle 10 having a steering wheel 24 with a passenger cabin 12 defined in part by a roof 14 and a windshield 16 and a floor 17. An exemplary dashboard 18 is disposed between a seating area and windshield 16. A driver seat 20 is disposed in a driver seat location in the seating area of passenger cabin 12. Seat 20 is oriented in a conventional forward-facing direction. An exemplary removable steering wheel module 22 is disposed in a receiving niche 23 of dashboard 18. Niche 23, best shown in FIG. 9 is located in dashboard 18 so as to be aligned with a driver seat location and can be being selectively filled by each of the removable steering module 22 and a removable filler module 38. (See FIG. 6.)

Figure 7:
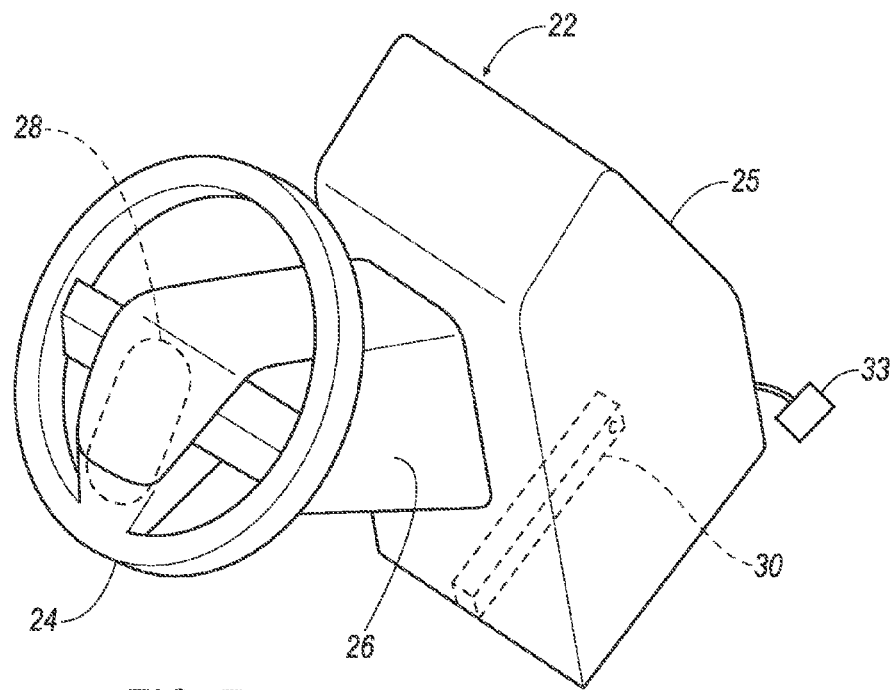
FIG. 7 is a perspective view of an exemplary steering module.

Steering wheel module 22, best seen in FIG. 7, includes a steering module base 25 formed to fit within niche 23, and shaped to be complementary to and consistent in appearance with the rest of dashboard 18. The exemplary base 25 has a substantially line-to-line fit with dashboard 18. A trim panel provides base 25 with a pleasing appearance. Steering wheel 24 is mounted to a steering wheel support 26 of module 22. Support 26 includes a rotatable feature (not shown). Exemplary rotatable features include a short bearing-supported shaft, or, alternatively, a bearing having an attachment feature in fixed engagement with steering wheel 24. A steering wheel air bag 28 is disposed in steering wheel 24 in a well-known manner. Airbag 28 is illustrated in an inflated condition in FIG. 2. A driver occupant 29 is shown in seat 20. A selectively engageable steering module mount is incorporated into removable steering wheel module 22 and vehicle dashboard 18, providing a means of fixing module 22 to dashboard 18. The mount can include, by way of example, a sliding engagement feature in which base 25 has a rail 30 fixable thereto slidably received by a receiving channel 31, best seen in FIG. 9, fixable to dashboard 18. A pin or threaded fastener (not shown) passes through rail 30 and channel 31, locking module 22 in an installed position. Rail 30 may be characterized as a first part of the steering module mount, and channel 31 may be characterized as a second part of the steering module mount. An alternative mount (not shown) includes aligned apertures in module 22 and walls of niche 23 receiving threaded fasteners. The precise nature of the mount is not critical to the present disclosure.

The steering module mount is supplemented by additional interface elements such as a steering wheel connector. The nature of the steering wheel connector depends on whether steering wheel 24 is mechanically connected to a steering actuator 27 as through a steering column, or is connected only by wires 37A, 37B as with steer-by-wire systems.

When steering wheel 24 is mechanically connected to the vehicle steering actuator 27, the exemplary module 22 includes an upper portion of a steering column (not shown). A connector of the upper portion of the steering column with a lower steering column portion enables attaching and detaching the upper portion of the steering column of the module to and from a lower portion of the steering column that remains in the vehicle. Examples of such a connector include a slideably engaged splined shaft and sleeve combination, or alternatively a universal joint connecting the lower upper portion of the steering column with the lower portion of the steering column. Additionally, when module 22 with a mechanically connected steering wheel 24 is removed, compensation for removal of the steering wheel's inertia is desirable. Such compensation can be achieved by installing a rotational inertia mass on the lower portion of the column, and/or by compensating for the inertia change with software for the steering actuator 27. A multi-pin connector electrically connects airbag 28 with a vehicle electric signal bus (not shown).

When the steering system is a steer-by-wire system, an exemplary module 22 includes a combination of a feedback motor, sensors, and a bearing-mounted stub shaft. An exemplary electrical connector such as multi-pin plug and socket connector is provided between module 22 and dashboard 18 and serves as the steering wheel connector. A module side 33 of the connector is illustrated in FIG. 7, extending by an electrical cable from base 25. Module side 33 mates with a dashboard side 35 of the connector, illustrated in FIG. 9. The electrical connector provides electrical connections for both airbag 28 and the steer-by-wire system. The connector is disconnected with the unplugging of dashboard side 35 from module side 33, in association with removal of module 22 from dashboard 18 and is connected with the plugging of dashboard side 35 into module side 33 in association with installation of module 22. Each type of steering system requires a compatible steering wheel connector. The appropriate level of convenience and ease of removing and reinstalling module 22 also depends on the use of module 22. When module 22 is only used for vehicle development, and installation and removal is limited to a small number of development vehicles, there is less of a need to make the connector easy or convenient. In such circumstances, highly skilled technicians having a full range of tools and power equipment are typically available to install and extract module 22. The precise details of the connector are not needed in this disclosure because, independent of the nature of the type of steering system employed, a design of a functional connector is within the range of skill of one skilled in the art to provide.

An exemplary removable pedal module 32, associated with module 22, is removably fixed to vehicle floor 17 to maintain it in a forward position. Alternatives for fixing module 32 to floor 17 include threaded fasteners and spring-loaded snap engagement features. Module 32 includes an accelerator pedal 34 and a brake pedal 36. Displacement of pedals 34 and 36 is detected with electronic displacement transducers incorporated into module 32. An electrical connector such as a multi-pin connector connects module 32 with the vehicle signal bus. Module 32 also includes displacement control features opposing pedal movement in a first direction and restoring pedals to a start position to simulate mechanical connections with a braking system and a drive motor. An exemplary displacement control feature for accelerator pedal 34 is a spring. An alternative feature is an electric actuator operated by software programmed to simulate accelerator pedal resistance and restoring force. An exemplary control feature for brake pedal 36 is a combination of a spring and a gas damper. An alternative feature is an electric actuator operated by software programmed to simulate brake pedal resistance and restoring force.

Figure 3:
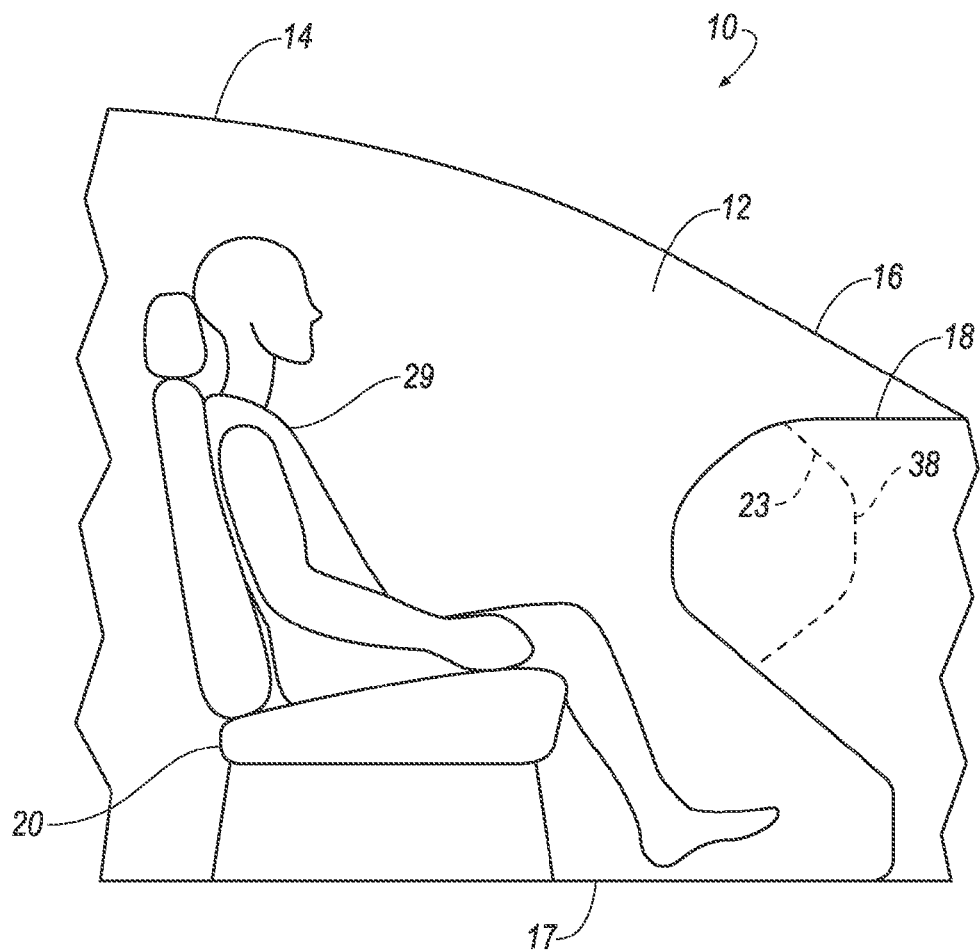
FIG. 3 is a schematic side view of an exemplary driver seat arrangement of a vehicle with both the steering wheel and floor control pedals removed.
Figure 4:
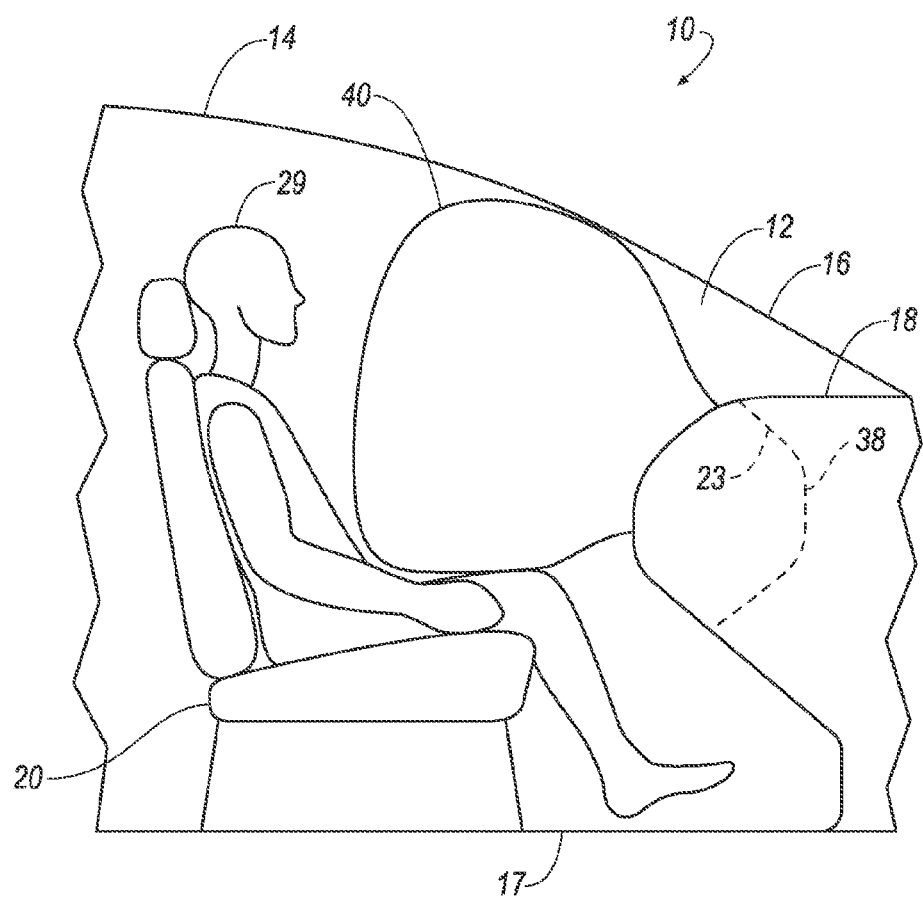
FIG. 4 is a schematic side view of the exemplary driver seat arrangement of FIG. 3 with an airbag deployed.
Figure 6:
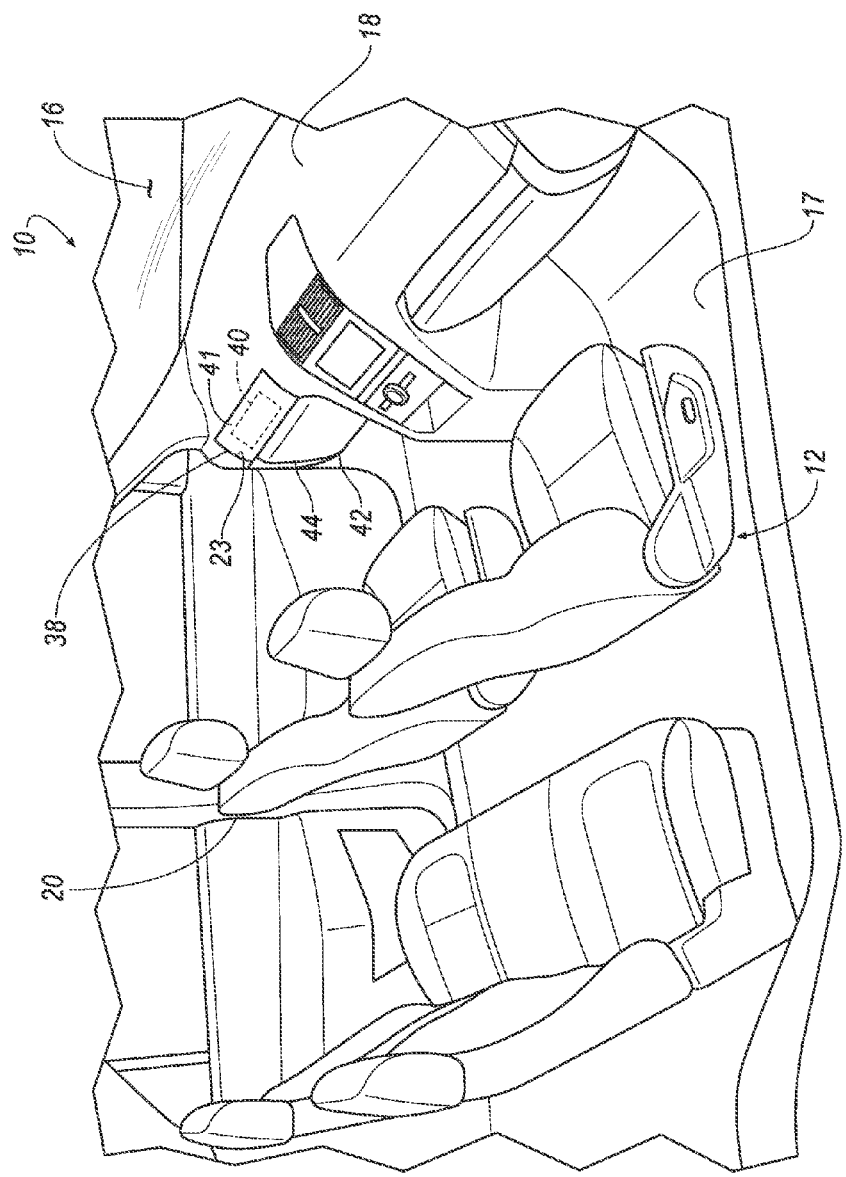
FIG. 6 is a perspective view of the exemplary interior seat and dashboard arrangement of FIG. 3.
Figure 8:
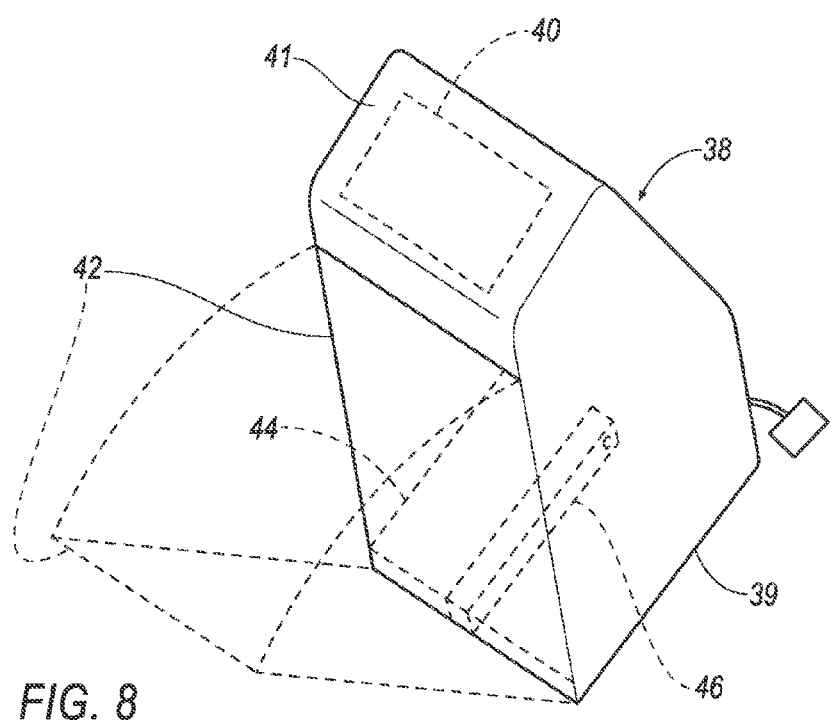
FIG. 8 is a perspective view of an exemplary filler module.

FIG. 3, FIG. 4 and FIG. 6 show a portion of vehicle 10 with an exemplary removable filler module 38 in place of the removable steering wheel module 22 and with pedal module 32 removed. Filler module 38, best seen in FIG. 8, includes a filler module base 39 formed to fit within niche 23, and shaped to be complementary to and consistent in appearance with the rest of dashboard 18. Exemplary base 39 has a substantially line-to-line fit with dashboard 18. Exemplary module 38 includes a dashboard airbag 40 disposed beneath an upper trim panel 41. An inflated airbag 40 is illustrated in FIG. 4. A lower part of module 38 includes a lower trim panel 42. Panel 42 may be incorporated into a pivotable door for a glove box storage compartment 44 integrated into module 38. A selectively engageable filler module mounting mount (not shown), substantially identical to the steering module mount and in an exemplary embodiment, including a filler module mounting rail 46 identical to rail 30, is incorporated into removable filler module 38 for receipt by channel 31 and fixing module 38 to dashboard 18. Rail 46 may be characterized as a first part of the filler module mount.

Alternative embodiments (not shown) of steering wheel module 22 and filler module 38 are smaller in that they do not include an upper portion of modules 22 and 38 corresponding a section of module 38 in which airbag 40 is disposed. Removable filler module 38 includes lower trim panel 42 and base 39, optionally including a glove box 44. An airbag 40 is not included in the filler module and is instead permanently mounted in dashboard 18. When steering wheel module 22 is installed in dashboard 18, there are two airbags on the driver side: one in the steering wheel and one in the dashboard. System logic stored in an electronic control unit (not shown) deactivates airbag 40 when steering wheel 24 with air bag 28 is installed.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, sensor measurements, computations, processing time, communications time, etc.

It is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto, along with the full scope of equivalents to which such claims are entitled. Unless otherwise stated or qualified herein, all claim terms are intended to be given their plain and ordinary meanings. It is anticipated and intended that future developments will occur in the arts discussed herein, and that the disclosed systems and methods will be incorporated into such future embodiments. In sum, it should be understood that the disclosed subject matter is capable of modification and variation.

The invention claimed is:
1. A dashboard assembly for a vehicle comprising:
   a dashboard defining a receiving niche alignable with a driver seat location and the niche being alternatively fillable in a first configuration by a removable steering module and in a second configuration by a removable filler module;
   the removable steering module including:
      a steering module base,
      a steering wheel support fixed to the steering module base,
      a steering wheel rotatably fixed to the steering wheel support,
      a steering wheel connector for connecting the steering wheel to a vehicle steering actuator; and the removable filler module including a filler module base sized to fill the niche with a substantially line-to-line fit with the dashboard.

2. The dashboard assembly of claim 1, the dashboard including an airbag disposed therein and the steering module including an airbag disposed in the steering wheel.

3. The dashboard assembly of claim 1, the filler module including an airbag disposed therein and the steering module including an airbag disposed in the steering wheel.

4. The dashboard assembly of claim 1, the filler module including a storage compartment incorporating a trim panel.

5. The dashboard assembly of claim 1, wherein:
the removable steering module includes a first part of a selectively engageable steering module mount fixed to the steering module base,
a second part of the steering module mount is incorporated into the vehicle dashboard with the first part and the second part cooperatively fixing the steering module to the dashboard, and
the removable filler module includes a first part of a selectively engageable filler module mount substantially identical to the first part of the steering module mount with the first part of the filler module mount and the second part of the steering module mount cooperatively fixing the filler module to the dashboard.

6. The dashboard assembly of claim 1, further comprising a pedal module.

7. The dashboard assembly of claim 1, the steering wheel connector being a mechanical connector.

8. A vehicle having a dashboard assembly:
a dashboard defining a receiving niche aligned with a driver seat location and the niche being alternatively fillable in a first configuration by a removable steering module and in a second configuration by a removable filler module;
the removable steering module including:
a steering module base,
a steering wheel support fixed to the steering module base,
a steering wheel rotatably fixed to the steering wheel support,
a steering wheel connector for connecting the steering wheel to a vehicle steering actuator; and
the removable filler module including a filler module base sized to fill the niche with a substantially line-to-line fit with the dashboard.

9. The vehicle of claim 8, the dashboard including an airbag disposed therein and the steering module including an airbag disposed in the steering wheel.

10. The vehicle of claim 8, the filler module including an airbag disposed therein and the steering module including an airbag disposed in the steering wheel.

11. The vehicle of claim 8, the filler module including a storage compartment incorporating a trim panel.

12. The vehicle of claim 8, wherein:
the removable steering module includes a first part of a selectively engageable steering module mount fixed to the steering module base,
a second part of the steering module mount is incorporated into the vehicle dashboard with the first part and the second part cooperatively fixing the steering module to the dashboard, and
the removable filler module includes a first part of a selectively engageable filler module mount substantially identical to the first part of the steering module mount with the first part of the filler module mount and the second part of the steering module mount cooperatively fixing the filler module to the dashboard.

13. The vehicle of claim 8, further comprising a pedal module.

14. The vehicle of claim 8, the steering wheel connector being a mechanical connector.

* * * * *